United States Patent [19]
Kennedy et al.

[11] Patent Number: 5,620,804
[45] Date of Patent: Apr. 15, 1997

[54] METAL MATRIX COMPOSITE BODIES CONTAINING THREE-DIMENSIONALLY INTERCONNECTED CO-MATRICES

[75] Inventors: Christopher R. Kennedy, Newark, Del.; Michael K. Aghajanian, Bel Air, Md.; Alan S. Nagelberg, Wilmington, Del.

[73] Assignee: Lanxide Technology Company, LP, Newark, Del.

[21] Appl. No.: 72,673

[22] Filed: Jun. 7, 1993

Related U.S. Application Data

[62] Division of Ser. No. 897,617, Jun. 10, 1992, abandoned, which is a continuation of Ser. No. 685,781, Apr. 15, 1991, abandoned, which is a continuation of Ser. No. 269,369, Nov. 10, 1988, Pat. No. 5,007,475.

[51] Int. Cl.$^6$ ............................... C22C 1/09; C22C 1/10
[52] U.S. Cl. ..................... 428/609; 428/614; 428/539.5
[58] Field of Search ..................... 428/614, 545, 428/609, 539.5

[56] References Cited

U.S. PATENT DOCUMENTS

| | | | |
|---|---|---|---|
| 1,902,478 | 3/1933 | Wiegand | 428/567 |
| 2,096,252 | 10/1937 | Koehring | 428/567 |
| 2,671,955 | 3/1954 | Grubel et al. | 428/567 |
| 2,951,771 | 9/1960 | Butler | 117/114 |
| 3,031,340 | 4/1962 | Girardot | 428/420 |
| 3,149,409 | 9/1964 | Maruhn | 428/614 |
| 3,396,777 | 8/1968 | Reding, Jr. | 164/97 |
| 3,547,180 | 12/1970 | Cochran et al. | 164/61 |
| 3,608,170 | 9/1971 | Larson et al. | 428/545 |
| 3,718,441 | 2/1973 | Landingham | 428/539.5 |
| 3,721,550 | 3/1973 | Schreiner et al. | 419/27 |
| 3,864,154 | 2/1975 | Gazza et al. | 428/539.5 |
| 3,868,267 | 2/1975 | Gazza et al. | 264/60 |
| 3,915,699 | 10/1975 | Umehara et al. | 419/17 |
| 3,969,553 | 7/1976 | Kondo et al. | 427/299 |

(List continued on next page.)

FOREIGN PATENT DOCUMENTS

| | | |
|---|---|---|
| 143330 | 6/1985 | European Pat. Off. . |
| 250210 | 12/1987 | European Pat. Off. . |
| 280830 | 9/1988 | European Pat. Off. . |
| 0340957 | 11/1989 | European Pat. Off. . |
| 0364963 | 4/1990 | European Pat. Off. . |
| 2166925 | 9/1976 | Germany . |
| 2819076 | 10/1979 | Germany . |
| 0144441 | 8/1983 | Japan . |
| 60-9568 | 1/1985 | Japan . |
| 60-177102 | 11/1985 | Japan . |
| 61-127847 | 6/1986 | Japan . |
| 62-230663 | 10/1987 | Japan . |
| 2156718 | 10/1985 | United Kingdom . |

OTHER PUBLICATIONS

Abdul–Lattef et al, "Preparation of Al–Al$_2$O$_3$–Mgo cast particulate composites using MgO coating technique", J. of Mat. Science Letters, 4, (1985) 385–388.

F. Delannay, L. Froyen, and A. Deruyttere, "Review: The Wetting of Solids by Molten Metals and Its Relation to the Preparation of Metal–Matrix Composites", Journal of Materials Science, vol. 22, No. 1, pp. 1–16, Jan. 1987.

(List continued on next page.)

*Primary Examiner*—Ngoc-Yen Nguyen
*Attorney, Agent, or Firm*—Jeffrey R. Ramberg

[57] ABSTRACT

The present invention relates to the formation of a metal matrix composite body by the spontaneous infiltration of a molten matrix metal into a three-dimensionally interconnected material. Moreover, the three-dimensionally interconnected material may contain filler material within at least a portion of its porosity. Particularly, an infiltration enhancer and/or an infiltration enhancer precursor and/or an infiltrating atmosphere are in communication with a filler material and/or a three-dimensionally interconnected material and/or a matrix metal at least at some point during the process, which permits molten matrix metal to spontaneously infiltrate the three-dimensionally interconnected material and any filler material contained within at least a portion of the porosity of the three-dimensionally interconnected material.

21 Claims, 2 Drawing Sheets

U.S. PATENT DOCUMENTS

| | | | |
|---|---|---|---|
| 4,082,864 | 4/1978 | Kendall et al. | 427/226 |
| 4,327,156 | 4/1982 | Dillon et al. | 419/27 |
| 4,370,390 | 1/1983 | Burke | 428/614 |
| 4,376,803 | 3/1983 | Katzman | 428/408 |
| 4,376,804 | 3/1983 | Katzman | 428/408 |
| 4,404,262 | 9/1983 | Watmough | 428/539.5 |
| 4,450,207 | 5/1984 | Donomoto et al. | 428/614 |
| 4,473,103 | 9/1984 | Kenney et al. | 167/97 |
| 4,559,246 | 12/1985 | Jones | 427/299 |
| 4,570,316 | 2/1986 | Sakamaki et al. | 29/889 |
| 4,587,177 | 5/1986 | Toaz et al. | 428/614 |
| 4,630,665 | 12/1986 | Novak | 167/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,677,901 | 7/1987 | Ban et al. | 92/213 |
| 4,679,493 | 7/1987 | Munro et al. | 92/212 |
| 4,713,111 | 12/1987 | Cameron et al. | 75/684 |
| 4,713,360 | 12/1987 | Newkirk et al. | 423/345 |
| 4,731,298 | 3/1988 | Shindo et al. | 428/611 |
| 4,753,690 | 6/1988 | Wada et al. | 428/614 |
| 4,802,524 | 2/1989 | Donomoto | 164/97 |
| 4,828,008 | 5/1989 | White et al. | 164/100 |
| 4,851,375 | 7/1989 | Newkirk et al. | 501/88 |
| 4,871,008 | 10/1989 | Dwivedi et al. | 164/6 |
| 4,932,099 | 6/1990 | Corwin | 164/97 |
| 4,935,055 | 6/1990 | Aghajanian et al. | 164/66.1 |
| 5,051,382 | 9/1991 | Newkirk et al. | 501/87 |

OTHER PUBLICATIONS

A. Mortensen, M. N. Gungor, J. A. Cornie, and M. C. Flemings, "Alloy Microstructures in Cast Metal Matrix Composites", Journal of Metals, vol. 38, No. 3, pp. 30–35, Mar. 1986.

G. R. Edwards and D. L. Olson, "The Infiltration Kinetics of Aluminum in Silicon Carbide Compacts", Annual Report from Center for Welding Research, Colorado School of Mines, under ONR Contract No. M00014–85–K–0451, DTIC Report AD–A184 682, Jul. 1987.

METAL MATRIX COMPOSITE BODIES CONTAINING THREE-DIMENSIONALLY INTERCONNECTED CO-MATRICES

This is a divisional of application Ser. No. 07/897,617, filed on Jun. 10, 1992, and now abandoned, which is a continuation of U.S. patent application Ser. No. 07/685,781, filed Apr. 15, 1991, and now abandoned, which is a continuation of U.S. patent application Ser. No. 07/269,369, filed on Nov. 10, 1988, which issued on Apr. 16, 1991, as U.S. Pat. No. 5,007,475.

FIELD OF THE INVENTION

The present invention relates to the formation of a metal matrix composite body by the spontaneous infiltration of a molten matrix metal into a three-dimensionally interconnected material. Moreover, the three-dimensionally interconnected material may include a filler material. Particularly, an infiltration enhancer and/or an infiltration enhancer precursor and/or an infiltrating atmosphere are in communication with a filler material and/or a three-dimensionally interconnected material and/or a matrix metal at least at some point during the process, which permits molten matrix metal to spontaneously infiltrate the three-dimensionally interconnected material, and any filler material which may be present.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers or materials having randomly oriented porosity.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the ease of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a three-dimensionally interconnected material, which optionally may contain filler material, with molten matrix metal (e.g., aluminum), in the presence of an infiltrating atmosphere (e.g., nitrogen), and under normal atmospheric pressures so long as an infiltration enhancer is present at least at some point during the process.

DESCRIPTION OF COMMONLY OWNED U.S. PATENT APPLICATIONS AND PATENTS

The subject matter of this application is related to that of several other commonly owned patent applications and patents. Particularly, these other patent applications and patents describe novel methods for making metal matrix composite materials (hereinafter sometimes referred to as "Commonly Owned Metal Matrix Patent Applications").

A novel method of making a metal matrix composite material is disclosed in Commonly Owned U.S. Pat. No. 4,828,008, which issued from U.S. patent application Ser. No. 049,171, filed May 13, 1987, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, which issued from U.S. patent application Ser. No. 141,642, filed Jan. 7, 1988, in the names of Michael K. Aghajanian et al., and entitled "Method of Making Metal Matrix Composite with the use of a Barrier". According to the method of this Aghajanian et al. invention, a barrier means (e.g., particulate titanium diboride or a graphite material such as a flexible graphite tape product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. patent application Ser. No. 049,171 was improved upon by Commonly Owned U.S. patent application Ser. No. 07/994,064 filed on Dec. 18, 1992, now U.S. Pat. No. 5,298,339, as a continuation of U.S. application Ser. No. 07/759,745, filed on Sep. 12, 1991, now abandoned, as a continuation of U.S. patent application Ser. No. 07/517,541, filed on Apr. 24, 1990, now abandoned, as a continuation of U.S. patent application Ser. No. 168,284, filed Mar. 15, 1988, now abandoned, in the names of Michael K. Aghajanian and Marc S. Newkirk and entitled "Metal Matrix Composites and Techniques for Making the Same." In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Each of the above-discussed Commonly Owned Metal Matrix Patent Applications Patents describes methods for the production of metal matrix composite bodies and novel metal matrix composite bodies which are produced therefrom. The entire disclosures of all of the foregoing Commonly Owned Metal Matrix Patent Applications Patents are expressly incorporated herein by reference.

SUMMARY OF THE INVENTION

A metal matrix composite body is produced by spontaneously infiltrating a three-dimensionally interconnected material, such as a three-dimensionally interconnected ceramic and/or metal.

Moreover, a metal matrix composite body can be produced by spontaneously infiltrating a three-dimensionally interconnected material which has included therein a permeable mass of filler material.

In either of the above cases, a co-matrix composite body is produced. Specifically, a first matrix of ceramic, metal, or both is present due to the three-dimensionally interconnected material which is infiltrated by the molten matrix metal, and a second matrix is created by the spontaneous infiltration of the matrix metal into the porosity of the first matrix, and any filler material which may be present therewith.

To obtain spontaneous infiltration, an infiltration enhancer and/or an infiltration enhancer precursor and/or an infiltrating atmosphere are in communication with the three-dimensionally interconnected material and/or optional filler material, at least at some point during the process, which permits molten matrix metal to spontaneously infiltrate the materials.

In a preferred embodiment of the invention, rather than supplying an infiltration enhancer precursor, an infiltration enhancer may be supplied directly to at least one of the three-dimensionally interconnected material, and/or matrix metal, and/or infiltrating atmosphere, and/or optional filler material. Ultimately, at least during the spontaneous infiltration, the infiltration enhancer should be located in at least a portion of the material to be infiltrated.

The three-dimensionally interconnected co-matrix material has specific advantageous characteristics in that it may impart certain desirable properties to the produced metal matrix composite which ordinarily would not be obtainable through the use of a similar material in a non-interconnected form (e.g., such as a particulate). Specifically, when the three-dimensionally interconnected co-matrix material is a ceramic, the final metal matrix composite may demonstrate increased stiffness and high temperature strength in relation to a metal matrix composite containing the same ceramic material but in particulate form only. Moreover, when the three-dimensionally interconnected co-matrix material is a metal, the final metal matrix composite may exhibit increased toughness because the areas of solid metal, i.e., areas containing little or no particulate, represented by the co-matrix, can act as crack blunters which prevent the propagation of cracks during stress.

Moreover, in a preferred embodiment, a three-dimensionally interconnected material is filled with a filler material, and thereafter, molten matrix metal is induced to spontaneously infiltrate both the filler material contained within the three-dimensionally interconnected material and the three-dimensionally interconnected material itself. Such a co-matrix body can exhibit even further advantageous mechanical properties.

It is noted that this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. However, other matrix metal/infiltration enhancer precursor/infiltrating atmosphere systems may also behave in a manner similar to the system aluminum/magnesium/nitrogen. For example, similar spontaneous infiltration behavior has been observed in the aluminum/strontium/nitrogen system; the aluminum/zinc/oxygen system; and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner.

When the matrix metal comprises an aluminum alloy, the aluminum alloy is contacted with a three-dimensionally interconnected material, and/or a preform comprising a filler material (e.g., alumina or silicon carbide), and/or a loose mass of filler material, said three-dimensionally interconnected material, preform, and/or filler material having admixed therewith, and/or at some point during the process being exposed to, magnesium. Moreover, in a preferred embodiment, the aluminum alloy and/or three-dimensionally interconnected material, preform, or filler material are contained in a nitrogen atmosphere for at least a portion of the process. The three-dimensionally interconnected material or preform (or filler material) will be spontaneously infiltrated and the extent or rate of spontaneous infiltration and formation of metal matrix will vary with a given set of process conditions including, for example, the concentration of magnesium provided to the system (e.g., in the aluminum alloy and/or in the three-dimensionally interconnected material, filler material (or preform) and/or in the infiltrating atmosphere), the size and/or composition of the particles in the preform or filler material, the size and extent of porosity in the three-dimensionally interconnected material, the concentration of nitrogen in the infiltrating atmosphere, the time permitted for infiltration, and/or the temperature at which infiltration occurs. Spontaneous infiltration typically occurs to an extent sufficient to embed substantially completely the three-dimensionally interconnected material, preform, or filler material.

When a three-dimensionally interconnected material is to be spontaneously infiltrated with a matrix metal, the infiltration enhancer or precursor to the infiltration enhancer may be located within the porosity of the material or on the surface of the material. Further, if a filler material is used in conjunction with the three-dimensionally interconnected material (e.g., located within at least a portion of the porosity of the interconnected material), the infiltration enhancer or the precursor to the infiltration enhancer may additionally be located within the filler material (e.g., within the porosity of the filler bed or as a coating on or within the individual filler particles).

DEFINITIONS

"Aluminum", as used herein means, and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material, preform, or three-dimensionally interconnected material, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material, preform, or three-dimensionally interconnected material is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Infiltrating Atmosphere", as used herein, means that atmosphere which is present which interacts with the matrix metal and/or preform, filler material, or three-dimensionally interconnected material and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material, preform, or three-dimensionally interconnected material. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material, preform, or three-dimensionally interconnected material. Moreover, the infiltration enhancer may be supplied directly to at least one of the three-dimensionally interconnected material, filler material, or preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material, preform, or three-dimensionally interconnected material, to achieve spontaneous infiltration.

"Infiltration Enhancer Precursor" or "Precursor to the Infiltration Enhancer", as used herein, means a material which when used in combination with the matrix metal, preform, filler material, or three-dimensionally interconnected material and/or infiltrating atmosphere forms an infiltration enhancer which induces or assists the matrix metal to spontaneously infiltrate the filler material, preform, or three-dimensionally interconnected material. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform, filler material, or three-dimensionally interconnected material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material, preform or three-dimensionally interconnected material by the matrix metal; and/or (2) a reaction of the infiltration enhancer precursor with the infiltrating atmosphere to form a solid, liquid or gaseous infiltration enhancer in at least a portion of the filler material, preform, or three-dimensionally interconnected material which enhances wetting; and/or (3) a reaction of the infiltration enhancer precursor within the filler material, preform, or three-dimensionally interconnected material which forms a solid, liquid or gaseous infiltration enhancer in at least a portion of the filler material, preform, or three-dimensionally interconnected material which enhances wetting.

"Matrix Metal" or "Matrix Metal Alloy", as used herein, means that metal which is utilized to form a metal matrix composite (e.g., before infiltration) and/or that metal which is intermingled with a filler material or a three-dimensionally interconnected material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform, filler material, or three-dimensionally interconnected material. It should be understood that whenever a "/" appears between an exemplary matrix metal, infiltration enhancer precursor and infiltrating atmosphere, the "/" is used to designate a system or combination of materials which, when combined in a particular manner, exhibits spontaneous infiltration into a preform, filler material, or three-dimensionally interconnected material.

"Metal Matrix Composite" or "MMC", as used herein, means a material comprising a two- or three-dimensionally interconnected alloy or matrix metal which has embedded a preform, filler material, or three-dimensionally interconnected material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler, a preform, or a three-dimensionally interconnected material so that, when the metal is molten, it may flow to replenish, or in some cases to initially provide and subsequently replenish, that portion, segment or source of matrix metal which is in contact with the filler, preform, or three-dimensionally interconnected material.

"Spontaneous Infiltration", as used herein, means that the infiltration of matrix metal into the permeable mass of filler, preform, or three-dimensionally interconnected material occurs without requirement for the application of pressure or vacuum (whether externally applied or internally created).

"Three-Dimensionally Interconnected Material", as used herein, means any three-dimensionally interconnected material which is sufficiently porous to accommodate spontaneous infiltration of molten matrix metal thereinto and displays a degree of bonding between individual particles which is greater than would be obtained through partial calcining or use of a binder. Such a three-dimensionally interconnected material may include sufficient porosity such that a filler material can, optionally, also be included therein. Moreover, the three-dimensionally interconnected material could have a composition which is similar to, or quite different from, the matrix metal utilized.

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Figure 1:
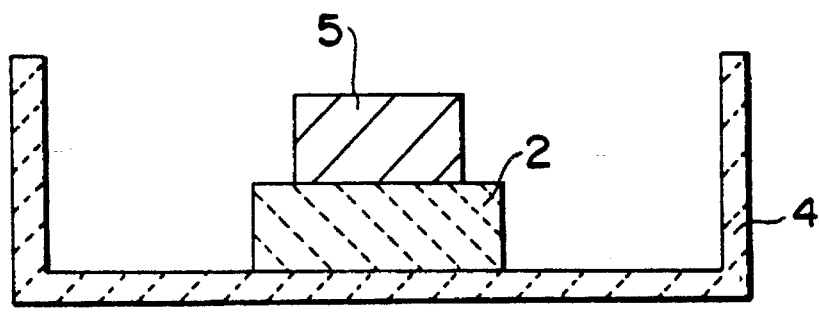
FIG. 1 is a cross-sectional view of the setup utilized in Example 1 to infiltrate matrix metal into three-dimensionally interconnected ceramic filter.

The present invention relates to forming a metal matrix composite by spontaneously infiltrating a three-dimensionally interconnected material, which optionally contains a filler material, with molten matrix metal. Particularly, an infiltration enhancer and/or infiltration enhancer precursor and/or an infiltrating atmosphere are in communication with at least one of the three-dimensionally interconnected material, the optional filler material and/or the matrix metal, at least at some point during the process, which permits molten matrix metal to spontaneously infiltrate the material.

When a three-dimensionally interconnected material is infiltrated, a co-matrix composite body is produced. Specifically, the metal matrix composite contains a first matrix of ceramic, metal, or both which is infiltrated by molten matrix metal, thereby creating a second matrix (i.e., a co-matrix) by the spontaneous infiltration of the matrix metal into the porosity of the first matrix, which, optionally, may also include filler material.

The three-dimensionally interconnected co-matrix material has specific advantageous characteristics in that it may impart certain desirable properties to the produced metal matrix composite body which would not be achieved through the use of a similar material in non-interconnected form (e.g., such as particulate). Specifically, when the three-dimensionally interconnected co-matrix material comprises a ceramic, the produced metal matrix composite may demonstrate increased stiffness and high temperature strength relative to a metal matrix composite containing the same ceramic material but in particulate form only. Moreover, when the three-dimensionally interconnected co-matrix material comprises a metal, the produced metal matrix composite may exhibit increased toughness because the areas of solid metal (i.e., areas containing little or no particulate), represented by the co-matrix, may act as crack blunters which prevent the propagation of cracks during the application of stress.

Moreover, when a three-dimensionally interconnected material is filled with a filler material, and thereafter, molten matrix metal is induced to spontaneously infiltrate both the filler material contained within the three-dimensionally interconnected material, and the three-dimensionally interconnected material itself, the resulting co-matrix body can exhibit even further advantageous mechanical properties.

In order to effect spontaneous infiltration of the matrix metal into the filler material (or preform) and/or the three-dimensionally interconnected material, an infiltration enhancer should be provided to the spontaneous system. An infiltration enhancer could be formed from an infiltration enhancer precursor which could be provided (1) in the matrix metal; and/or (2) in the filler material, preform or three-dimensionally interconnected material; and/or (3) from the infiltrating atmosphere and/or (4) from an external source into the spontaneous system. Moreover, rather than supplying an infiltration enhancer precursor, an infiltration enhancer may be supplied directly to at least one of the filler material, preform, three-dimensionally interconnected material, and/or matrix metal, and/or infiltrating atmosphere. Ultimately, at least during the spontaneous infiltration, the infiltration enhancer should be located in at least a portion of the filler material, preform and/or three-dimensionally interconnected material.

In a preferred embodiment it is possible that the infiltration enhancer precursor can be at least partially reacted with the infiltrating atmosphere such that infiltration enhancer can be formed in at least a portion of the filler material, preform, or three-dimensionally interconnected material prior to or substantially simultaneously with contacting the filler material preform, or three-dimensionally interconnected material with molten matrix metal (e.g., if magnesium was the infiltration enhancer precursor and nitrogen was the infiltrating atmosphere, the infiltration enhancer could be magnesium nitride which would be located in at least a portion of the filler material, preform, or three-dimensionally interconnected material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not react with the aluminum matrix metal and/or the filler material or preform and/or the three-dimensionally interconnected material when the aluminum is made molten. A filler material or three-dimensionally interconnected material containing or being exposed to magnesium, and being exposed to, at least at some point during the processing, a nitrogen atmosphere, can then be contacted with the molten aluminum matrix metal. The matrix metal will then spontaneously infiltrate the filler material, preform, or three-dimensionally interconnected material.

Moreover, rather than supplying an infiltration enhancer precursor, an infiltration enhancer may be supplied directly to at least one of the filler material, preform, three-dimensionally interconnected material and/or matrix metal, and/or infiltrating atmosphere. Ultimately, at least during the spontaneous infiltration, the infiltration enhancer should be located in at least a portion of the filler material, preform, or three-dimensionally interconnected material.

Under the conditions employed in the method of the present invention, in the case of an aluminum/magnesium/nitrogen spontaneous infiltration system, the filler material, preform, or three-dimensionally interconnected material should be sufficiently permeable to permit the nitrogen-containing gas to penetrate or permeate the filler material, preform, or three-dimensionally interconnected material at some point during the process and/or contact the molten matrix metal. Moreover, the permeable filler material, preform, or three-dimensionally interconnected material can accommodate infiltration of the molten matrix metal, thereby causing the nitrogen-permeated filler material, preform, or three-dimensionally interconnected material to be infiltrated spontaneously with molten matrix metal to form a metal matrix composite body and/or cause the nitrogen to react with an infiltration enhancer precursor to form infiltration enhancer in the filler material, preform, or three-dimensionally interconnected material, thereby resulting in spontaneous infiltration. The extent or rate of spontaneous infiltration and formation of the metal matrix composite will vary with a given set of process conditions, including magnesium content of the aluminum alloy, magnesium content of the filler material, preform, or three-dimensionally interconnected material, amount of magnesium nitride in the filler material, preform, or three-dimensionally interconnected material, the presence of additional alloying elements (e.g., silicon, iron, copper, manganese, chromium, zinc, and the like), average size of the filler material (e.g., particle diameter), surface condition and type of filler material, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1% by weight, and preferably at least about 3% by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material, preform, or three-dimensionally interconnected material. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in the filler material, preform, or three-dimensionally interconnected material and matrix metal or the filler material, preform, or three-dimensionally interconnected material alone may result in a reduction i n the required amount of magnesium to achieve spontaneous infiltration (discussed in greater detail later herein).

The volume percent of nitrogen in the nitrogen atmosphere also affects formation rates of the metal matrix composite body. Specifically, if less than about 10 volume percent of nitrogen is present in the infiltrating atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or filler material, preform, or three-dimensionally interconnected material increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, high nitrogen concentration, or one or more auxiliary alloying elements. When no magnesium is added to the filler material, preform, or three-dimensionally interconnected material, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon® (99 percent pure silicon carbide from Norton Co.). However, in the presence of magnesium, silicon has been found to promote the infiltration process. As a further example, the amount of magnesium varies if it is supplied exclusively to the preform, filler material or three-dimensionally interconnected material. It has been discovered that spontaneous infiltration will occur with a lesser weight percent of magnesium supplied to the spontaneous system when at least some of the total amount of magnesium supplied is placed in the preform, filler material, or three-dimensionally interconnected material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above. It is also noted that it is possible to supply to the spontaneous system infiltration enhancer precursor and/or infiltration enhancer on a surface of the alloy and/or on a surface of the preform, filler material, or three-dimensionally interconnected material, and/or within the preform, filler material, or three-dimensionally interconnected material prior to infiltrating the matrix metal into the filler material, preform, or three-dimensionally interconnected material (i.e., it may not be necessary for the supplied infiltration enhancer or infiltration enhancer precursor to be alloyed with the matrix metal, but rather, simply supplied to the spontaneous system). If the magnesium was applied to a surface of the matrix metal, it may be preferred that said surface should be the surface which is closest to, or preferably in contact with, the permeable mass of filler material or vice versa; or such magnesium could be mixed into at least a portion of the preform, filler material or three-dimensionally interconnected material. Still further, it is possible that some combination of surface application, alloying and placement of magnesium into at least a portion of the filler material, preform, or three-dimensionally interconnected material could be used. Such combination of applying infiltration enhancer(s) and/or infiltration enhancer precursor(s) could result in a decrease in the total weight percent of magnesium needed to promote infiltration of the matrix aluminum metal into the filler material, preform, or three-dimensionally interconnected material, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler, preform, or three-dimensionally interconnected material, also tends to affect the extent of infiltration at a given temperature. Consequently, in some cases where little or no magnesium is contacted directly with the preform, filler material, or three-dimensionally interconnected material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g. to at least about 5 weight percent; and/or (2) when alloying constituents are mixed with the permeable mass of filler material, preform, or three-dimensionally interconnected material; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material or preform but not necessarily lower than the melting temperature of the three-dimensionally interconnected material (e.g., as demonstrated in Example 2, the three-dimensionally interconnected material could be comprised of metal having a means of support so that it can maintain its three-dimensionally interconnected geometry above its melting point). Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material, preform, or three-dimensionally interconnected material comes into contact with molten aluminum in the presence of, at least some time during the process, a nitrogen-containing gas. The nitrogen-containing gas may be supplied by maintaining a continuous flow of gas into contact with at least one of the filler material, preform or three-dimensionally interconnected material end/or molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g. alumina; (b) carbides, e.g. silicon carbide; (c) borides, e.g. aluminum dodecaboride, and (d) nitrides, e.g. aluminum nitride. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to other filler materials by having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in U.S. Pat. No. 4,851,375, which issued on Jul. 25, 1989, from U.S. Patent Commonly Owned Application Ser. No. 819,397 entitled "Composite Ceramic Articles and Methods of Making Same", in the names of Marc S. Newkirk et al, also exhibit desirable infiltration properties relative to commercially available alumina products. The subject matter of each of the above-described issued Patents is herein expressly incorporated by reference. Thus, it has been discovered that complete infiltration of B permeable mass of ceramic material can occur at lower infiltration temperatures and/or lower infiltration times by utilizing a crushed or comminuted body produced by the methods of the aforementioned U.S. Patents.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material, preform or three-dimensionally interconnected material to be infiltrated should be permeable (i.e., permeable to molten matrix metal and to the infiltrating atmosphere).

The method of forming metal matrix composites according to the present invention, not being dependent on the use of pressure to force or squeeze molten matrix metal into a preform, mass of filler material, or three-dimensionally interconnected material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with close cell porosity or into a fully dense structure that would prevent infiltration by the molten alloy.

It has been observed that for aluminum infiltration and matrix formation around a ceramic filler, wetting of the ceramic filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler, preform, or three-dimensionally interconnected material, the material to be infiltrated, and the nitrogen concentration of the infiltrating atmosphere. For example, the extent of aluminum nitride formation at a given process temperature is believed to increase as the ability of the alloy to wet the filler or three-dimensionally interconnected material decreases and as the nitrogen concentration of the atmosphere increases. In any event, in the context of the present application, the aluminum nitride which inherently forms is present in at least two separately identifiable and physically distinct forms. Specifically, one of the inherent forms of aluminum nitride present consists of a coating disposed on at least a portion of (1) the surfaces of the three-dimensionally interconnected material and (2) any filler material which may be present in conjunction with the three-dimensionally interconnected material such as in the open-porosity of the three-dimensionally interconnected material. Further, another form of the aluminum nitride which is inherently present is a phase comprising discrete, discontinuous bodies embedded within the matrix metal and contacted substantially only by the matrix metal.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the material to be infiltrated. In the ease of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material, preform, or three-dimensionally interconnected material, and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material, preform, or three-dimensionally interconnected material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the filler material.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material, preform, or three-dimensionally interconnected material is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particularly preferred form of graphite is a graphite tape product that is sold under the trademark Grafoil®, registered to Union Carbide. This graphite tape exhibits sealing characteristics that prevent the migration of molten aluminum alloy beyond the defined surface boundary of the filler material, preform, or three-dimensionally interconnected material. This graphite tape is also resistant to heat and is chemically inert. Grafoil® graphite material is flexible, compatible, conformable and resilient. It can be made into a variety of shapes to fit any barrier application. However, graphite barrier means may be employed as a slurry or paste or even as a paint film around and on the boundary of the filler material, preform, or three-dimensionally interconnected material. Grafoil® is particularly preferred because it is in the form of a flexible graphite sheet. In use, this paper-like graphite is simply formed around the filler material, preform, or three-dimensionally interconnected material.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically in a particulate form (1–30 microns). The barrier materials may be applied as a slurry or paste to the boundaries of the three-dimensionally interconnected material or permeable mass of ceramic filler material which preferably is preshaped as a preform.

Other useful barriers for aluminum metal matrix alloys in nitrogen include low-volatile organic compounds applied as a film or layer onto the external surface of the filler material, preform or three-dimensionally interconnected material. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material, preform, or three-dimensionally interconnected material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Thus, through use of the above-described barrier materials in combination with the present method for spontaneously infiltrating a three-dimensionally interconnected material, optionally containing a filler material, it is possible to create shaped metal matrix composite bodies containing co-matrices of metal-metal, or metal-ceramic.

When a metal matrix composite containing co-matrices of metal-metal is formed, the original three-dimensionally interconnected metal can be virtually any metal, including metals having melting points which may be lower than that of the infiltrating matrix metal. However, when the melting point of the three-dimensionally interconnected material is lower than the melting point of the infiltrating matrix metal, a suitable means for support must be supplied or formed on the three-dimensionally interconnected metal to permit such material to maintain its three-dimensionally inter connected geometry during the infiltration step. For example, the three-dimensionally interconnected material could be coated with a substance having a higher melting point than the infiltrating matrix metal and sufficient strength to contain the three-dimensionally interconnected metal while it is molten. Another technique of providing support means to the three-dimensionally interconnected metal is demonstrated in Example 2, where the porosity of the three-dimensionally interconnected material was filled with a slurry containing materials having a higher melting point than the infiltrating matrix metal. Upon drying, this slurry provided sufficient support to the three-dimensionally interconnected metal, which was molten at the infiltration temperatures, to permit said material to maintain its three-dimensionally interconnected geometry during the infiltration step.

Alternatively, the three-dimensionally interconnected material could comprise a metal and/or a ceramic having a higher melting point than the infiltrating matrix metal. Such materials typically would not need a support means to maintain their three-dimensionally interconnected geometry during the infiltration step. Thus, for example, a three-dimensionally interconnected matrix of iron could be infiltrated by a matrix metal having a melting point lower than the melting point of iron. Similarly, the three-dimensionally interconnected material could comprise a ceramic, such as alumina or silicon carbide, and such ceramic material could be infiltrated by a matrix metal having a melting point lower than the ceramic material.

Although the present invention has been described in terms of infiltrating a matrix metal into a single three-dimensionally interconnected material, optionally containing filler material, it should be recognized that additional three-dimensionally interconnected materials could be utilized during the infiltration step. Thus, for example, a three-dimensionally interconnected ceramic material could be interposed within a three-dimensionally interconnected metal and this dual-system could be infiltrated by a molten matrix metal to form a metal matrix composite body containing three matrices (e.g., three-dimensionally interconnected ceramic, three-dimensionally interconnected metal, and infiltrated metal matrix). Additionally, one or more three-dimensionally interconnected metal and/or ceramic materials could be stacked or juxtaposed in any manner so that at least one edge of one of the three-dimensionally interconnected materials is contacting another edge of a three-dimensionally interconnected material, and so on. This system could then be infiltrated with molten matrix metal to form a metal matrix composite body comprising different co-matrices in different sections of the metal matrix composite. It should be noted that the different sections of the metal matrix composite would be integrally bonded together by the matrix metal. Furthermore, in any of the systems described above, a filler material could be supplied within at least a portion of the porosity of the three-dimensionally interconnected materials and the filler material could be infiltrated simultaneously with the infiltration of the three-dimensionally interconnected materials by matrix metal.

The present invention has been described in terms of three-dimensional materials having porosity which is substantially random, i.e., non-aligned. For reasons which are clear to those skilled in the art, substantially random porosity is much more difficult to infiltrate with a molten matrix metal than substantially aligned, i.e., parallel, porosity. However, the instant invention is not limited to the infiltration of random porosity. Specifically, for certain product applications it may be desirable to have a co-matrix of metal or ceramic which has substantially aligned or parallel porosity. For instance, a tow of metal fibers, each fiber being substantially parallel to the fibers surrounding it and interconnected with such surrounding fibers to some degree, could be spontaneously infiltrated with a molten matrix metal to form a metal matrix composite body containing a three-dimensionally interconnected co-matrix of three-dimensionally interconnected, but parallel, metal fibers. Alternatively, a series of alumina honeycombs could be arranged so that the honeycomb porosity of each layer of honeycomb is substantially aligned. The honeycombs could then be filled with filler material and the entire system infiltrated with a molten matrix metal to form a metal matrix composite containing a three-dimensionally interconnected ceramic matrix, or a series of three-dimensionally interconnected ceramic matrices, embedded by an interconnected metal matrix composite.

Figure 2:
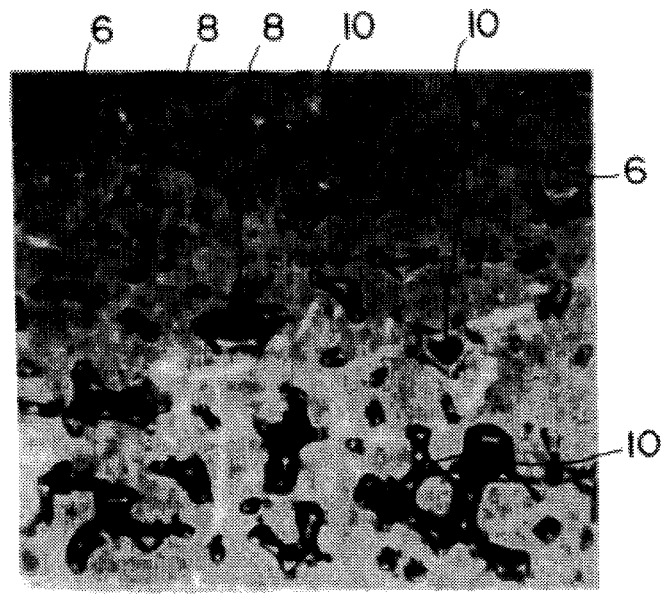
FIG. 2 is a photomicrograph of the microstructure of the metal matrix composite produced according to Example 1.

As shown in FIG. 2, the matrix metal can exhibit substantially complete infiltration of all available porosity within the three-dimensionally interconnected material. Thus, the matrix metal may not only infiltrate the porosity contained within the three-dimensionally interconnected structure, but it may also infiltrate the porosity contained within the material comprising the three-dimensionally interconnected structure. For example, if a three-dimensionally interconnected alumina structure is utilized as the three-dimensionally interconnected material, the matrix metal could infiltrate both the macro-porosity contained within the alumina structure itself and the micro-porosity contained within the actual alumina material. This substantially complete infiltration leads to excellent bonding between the metal matrix and the three-dimensionally interconnected structure. Further, when a three-dimensionally interconnected metal structure is utilized, the matrix metal may form alloys or intermetallics with the three-dimensionally interconnected metal, thus creating a bond between the matrix metal and the three-dimensionally interconnected metal structure.

In addition to utilizing three-dimensionally interconnected metal and ceramic materials, the method of the present invention could be utilized in combination with three-dimensionally interconnected materials formed by the techniques disclosed and claimed in commonly owned U.S. Pat. No. 4,713,360, which issued on Dec. 15, 1987; commonly owned U.S. Pat. No. 4,851,375, which issued from U.S. patent application Ser. No. 819,397, filed Jan. 17, 1986, in the names of Marc S. Newkirk et al and entitled "Composite Ceramic Articles and Methods of Making Same"; commonly owned U.S. Pat. No. 5,017,526, which issued from U.S. patent application Ser. No. 07/338,471, now U.S. Pat. No. 5,017,526, which was a continuation of U.S. patent application Ser. No. 861,025, filed May 8, 1986, now abandoned, in the names of Marc S. Newkirk et al, and entitled "Shaped Ceramic Composites and Methods of Making the Same"; commonly owned U.S. Pat. No. 4,828,785, which issued from U.S. patent application Ser. No. 823,542, filed Jan. 27, 1986, in the names of Marc S. Newkirk et al, and entitled "Inverse Shape Replication Method of Making Ceramic Composite Articles and Articles Obtained Thereby"; commonly owned U.S. Pat. No. 4,847,025, which issued from U.S. patent application Ser. No. 907,924, filed Sep. 16, 1986, in the names of Danny R. White, et al and entitled "Method of Making Ceramic Articles Having Channels Therein and Articles Made Thereby"; and commonly owned U.S. Pat. No. 4,808,558, which issued from U.S. patent application Ser. No. 089,376, filed Aug. 26, 1987, in the names of Eugene Sangmoo Park, et al and entitled "Ceramic Foams". For the purpose of showing the methods of producing such bodies and their properties, the entire disclosures of each of the above listed commonly owned U.S. Patents are herein incorporated by reference.

Particularly, the ceramic and ceramic composite bodies produced by the methods of these U.S. Patents could be utilized as the three-dimensionally interconnected material to be infiltrated by the matrix metal. Thus, the resulting metal matrix composite body would comprise a metal matrix embedding a three-dimensionally interconnected unique ceramic or ceramic composite material. Specifically, the resulting body would comprise a matrix metal embedding 1) a ceramic body comprising an essentially single phase ceramic skeletal structure and one or more nonoxidized constituents of the parent metal or voids or both; or 2) a ceramic composite body comprising one or more filler materials embedded by the above-described ceramic body. If a sufficient quantity of metal matrix is formed within said ceramic or ceramic composite bodies, such a body could be expected to have a higher fracture toughness than the ceramic or ceramic composite body alone and in general, many properties could be enhanced by the combination of the beneficial properties of the unique ceramic or ceramic composite matrix and the beneficial properties of the metal matrix.

Various demonstrations of the present invention are included in the Examples immediately following. However, these Examples should be considered as being illustrative and should not be construed as limiting the scope of the invention as defined in the appended claims.

EXAMPLE 1

This Example demonstrates that it is possible to spontaneously infiltrate a three-dimensional ceramic matrix with a matrix metal to form a metal matrix composite which includes a three-dimensionally interconnected ceramic matrix.

An approximately 1 inch by 1.5 inch by 0.5 inch ceramic filter comprised of approximately 99.5% pure aluminum oxide and containing about 45 pores per inch was obtained from High Tech Ceramics of Alfred, N.Y. As shown in FIG. 1, the ceramic filter (2) was placed in the bottom of an alumina boat (4) and an ingot (5) of an aluminum alloy having approximate dimensions of 1 inch by 1 inch by ½ inch and composed by weight of 5% silicon, 6% zinc, 10% magnesium, and the balance aluminum, was placed on top of the alumina filter (2). The setup comprising the alumina refractory boat (4) and its contents was placed in a tube furnace at room temperature. The furnace door was then closed and forming gas (96 volume percent nitrogen, 4 volume percent hydrogen) was supplied to the furnace at a gas flow rate of about 250 cc/minute. The furnace temperature was ramped at about 150° C./hour to about 775° C.; maintained at about 775° C. for about 7 hours; and then ramped down at about 200° C./hour to room temperature. Upon removal from the furnace, a metal matrix composite was recovered from the setup. The metal matrix composite was sectioned and a photomicrograph of the microstructure was obtained. This photomicrograph displayed as FIG. 2.

As shown in FIG. 2, complete infiltration of matrix metal (6) into the porosity of the ceramic filter (8) was obtained. Moreover, as indicated by the lines labelled (10) in FIG. 2, the matrix metal (6) infiltration was so complete that it infiltrated the porosity contained within the alumina component of the ceramic filter (8).

EXAMPLE 2

This Example demonstrates that it is possible to incorporate a preformed three-dimensionally interconnected metal structure within a metal matrix composite formed by spontaneous infiltration. In addition, this Example demonstrates that it is possible to spontaneously infiltrate a three-dimensionally interconnected material which is molten at the infiltration temperature, so long as there is a means of support which maintains the three-dimensionally interconnected geometry of the material during the infiltration step (e.g., the supporting means in this Example was a dried slurry of alumina and silicon carbide).

Figure 3:
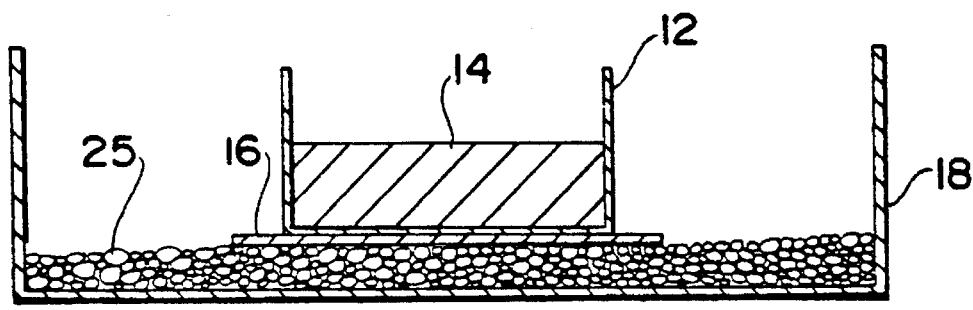
FIG. 3 is a cross-sectional view of the setup utilized in Example 2 prior to a slurry of alumina and silicon carbide being poured into the honeycomb structure.
Figure 4:
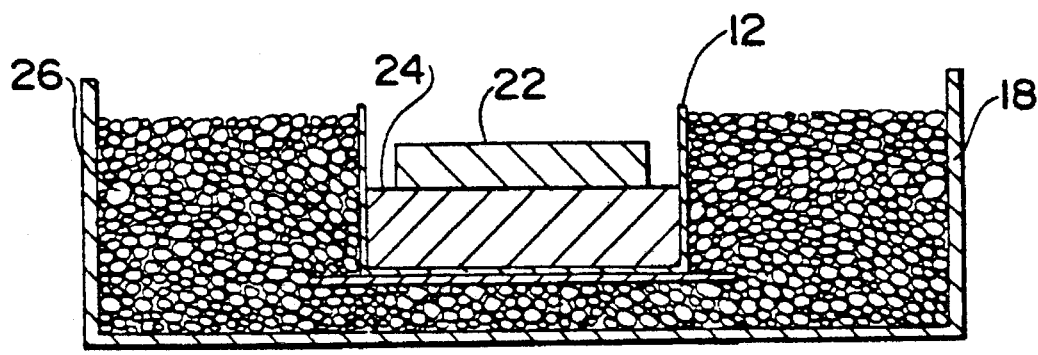
FIG. 4 is a cross-sectional view of the setup utilized in Example 2 to produce a metal matrix composite which embeds a three-dimensionally interconnected metal structure.

A piece of an aluminum honeycomb material, made from 5052 alloy by American Cyanamid Company and sold under the trademark Dura-Core®, having approximate dimensions of 3¾ inches by 1⅛ inch by 1 inch was placed within a box having approximate dimensions 3¾ inches by 1⅛ inch by 2 inches and constructed of a 15/1000 inch thick grade GTB graphite tape product, produced by Union Carbide and sold under the trademark Grafoil®. The box was produced by stapling appropriate size sections of the Grafoil® together and sealing the seams of the Grafoil® box with a slurry made by mixing graphite powder (grade KS-44 from Lonza, Inc.) and colloidal silica (Ludox HS from DuPont). The weight ratio of graphite to colloidal silica was about ⅓. Referring to FIG. 3, the box (12) containing the aluminum honeycomb material (14) was placed on top of a steel plate (16) contained within a graphite refractory boat (18). The steel plate (16), which had approximate dimensions of 5 inches by 3 inches by ¹⁄₁₀ inch, sat on top of an approximately ½ inch thick layer (25) of a 24 grit alumina material sold under the tradename Alundum®. After the Grafoil® box (12) containing the aluminum honeycomb material (14) was placed on top of the steel plate (16), a paste-like slurry of 90 grit green silicon carbide from Norton Co., and colloidal alumina (Nyacol Al-20) was sediment cast into the Grafoil® box (12) until the aluminum honeycomb (14) was filled with the slurry mixture. The approximate weight ratio of the colloidal alumina to the 90 grit silicon carbide was 70/30. As shown in FIG. 4, an ingot (22) of aluminum alloy having approximate dimensions 3 inches by 1½ inch by ½ inch and composed by weight of 12% silicon, 5% zinc, 6% magnesium, and the balance aluminum, was placed on top of the slurry filled aluminum honeycomb structure (24), after the slurry had dried within the honeycomb structure. Additional 24 grit Alundum® was then added to the graphite boat (18) until the level of the Alundum® bed (26) was approximately level with the top of the Grafoil® box (12).

Figure 5:
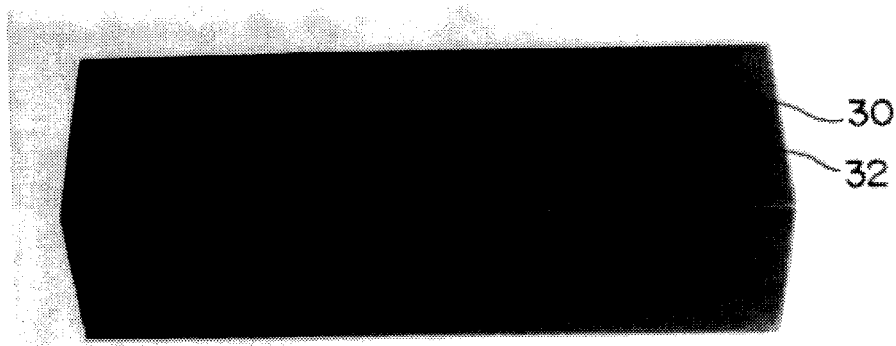
FIG. 5 is a perspective (i.e., top and side view) photograph of a metal matrix composite produced in accordance with Example 2.
Figure 6:
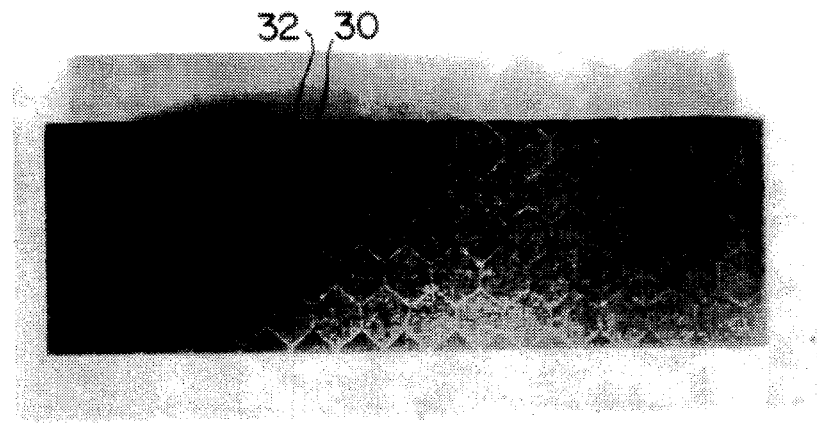
FIG. 6 is a photograph of the bottom of a metal matrix composite produced in accordance with Example 2.

The setup, consisting of the graphite boat and its contents, was placed in a controlled atmosphere electric resistance furnace (e.g., a vacuum furnace) at room temperature. The furnace was then evacuated at room temperature until a high vacuum ($1 \times 10^{-4}$ torr) was obtained. The furnace was then ramped over a 45 minute period to about 200° C. and maintained at about 200° C. for about two hours. At this point, the furnace was backfilled with nitrogen gas to approximately 1 atmosphere and a continuous nitrogen gas flow rate of about 2 liters/minute was established. The temperature in the furnace was then ramped over about a 5 hour period to about 850° C. and maintained at about 850° C. for about 25 hours. After the 25 hour heating period, the furnace was turned off and allowed to cool naturally to ambient room temperature. The setup was removed from the furnace at room temperature and disassembled. A metal matrix composite containing a three-dimensionally interconnected co-matrix of honeycombed metal was obtained. Upon subjecting the metal matrix composite to finishing operations, the three-dimensionally interconnected co-matrix of honeycombed metal was exposed. FIG. 5 is a perspective photograph (i.e., top and side view) of the finished metal matrix composite where the exposed aluminum honeycomb matrix is labelled (30) and the spontaneously infiltrated slurry material is labelled (32). FIG. 6 is a bottom view photograph of the finished metal matrix composite with the aluminum honeycomb matrix labelled (30) and the infiltrated slurry labelled (32). It is apparent from FIGS. 5 and 6 that the three-dimensionally interconnected aluminum honeycomb matrix in the final metal matrix composite displays near net shape replication. In addition, the metal matrix material formed by the spontaneous infiltration of the matrix metal into the slurry material is integrally bonded with the three-dimensional aluminum honeycomb matrix. Thus, the metal in the aluminum honeycomb and the metal in the infiltrated slurry material form a continuous and interconnected metal matrix throughout the metal matrix composite. Moreover, the aluminum honeycomb acts as a co-matrix of solid metal which contains no, or very little, particulate matter. This is important to the toughness of the final metal matrix composite because the areas of solid metal can act as crack blunters which prevent the propagation of cracks during stress. Thus, it is believed that this metal matrix composite will exhibit increased toughness due to the reinforcement of the metal matrix composite by the three-dimensionally interconnected aluminum honeycomb co-matrix.

What is claimed is:

1. A composite body, comprising:
   discontinuous aluminum nitride and
   a co-matrix embedding said aluminum nitride, said co-matrix comprising
      a three-dimensionally interconnected matrix metal and a three-dimensionally interconnected material, said three-dimensionally interconnected material comprising
      a three-dimensionally interconnected metal having a lower melting temperature than said matrix metal and disposed thereon a coating for supporting said interconnected metal while at a temperature above the melting temperature of said interconnected metal, said coating having a higher melting temperature than said matrix metal.

2. The composite body of claim 1, wherein said coating covers substantially all surfaces of said three-dimensionally interconnected material.

3. The composite body of claim 1, wherein said matrix metal comprises aluminum.

4. A composite body, comprising:
   aluminum nitride and a co-matrix embedding said aluminum nitride, said co-matrix comprising a three-dimensionally interconnected matrix metal and a three-dimensionally interconnected material, said three-dimensionally interconnected material comprising a three-dimensionally interconnected metal structure having a chemical composition different from the chemical composition of said matrix metal, and further having a higher melting point than said matrix metal, wherein at least a portion of said aluminum nitride contacts said matrix metal.

5. The composite body of claim 4, further comprising at least one filler material embedded by said co-matrix.

6. The composite body of claim 5, wherein said at least one filler material is at least partially embedded by said matrix metal.

7. The composite body of claim 5, wherein said at least one filler material comprises a material selected from the group consisting of aluminum oxide, silicon carbide, aluminum nitride and aluminum dodecaboride.

8. The composite body of claim 5, wherein said at least one filler material comprises a morphology selected from the group consisting of particles, whiskers and tubules.

9. The composite body of claim 5, wherein said at least one filler material comprises a morphology selected from the group consisting of platelets, whiskers, spheres and pellets.

10. The composite body of claim 4, wherein said matrix metal comprises aluminum.

11. The composite body of claim 10, wherein said matrix metal further comprises at least one material selected from the group consisting of silicon, iron, copper, manganese, chromium, zinc, magnesium, calcium and strontium.

12. The composite body of claim 4, wherein said portion of said aluminum nitride contacts only said matrix metal.

13. A composite body, comprising:
   a co-matrix comprising a three-dimensionally interconnected matrix metal and a three-dimensionally interconnected material, said three-dimensionally interconnected material comprising a three-dimensionally interconnected metal structure having a chemical composition different from the chemical composition of said matrix metal;
   at least one filler material embedded by said co-matrix; and
   aluminum nitride embedded by said co-matrix, wherein at least a portion of said aluminum nitride is in the form of discrete discontinuous bodies contacted only by said matrix metal, and further wherein at least a portion of said aluminum nitride is in the form of a coating disposed on at least a portion of said three-dimensionally interconnected material.

14. The composite body of claim 13, wherein said at least one filler material comprises a shape selected from the group consisting of platelets, fibers, spheres, tubules and pellets.

15. The composite body of claim 13, wherein said at least one filler material comprises at least one material selected from the group consisting of aluminum oxide, silicon carbide, aluminum nitride and aluminum dodecaboride.

16. The composite body of claim 13, wherein said matrix metal comprises aluminum.

17. The composite body of claim 13, wherein said three-dimensionally interconnected metal structure has a higher melting point than said matrix metal.

18. The composite body of claim 13, wherein said different metal has a lower melting point than said matrix metal, and wherein said composite body further comprises a coating for maintaining the geometry of the three-dimensionally interconnected material during fabrication of said composite body.

19. The composite body of claim 13, wherein said at least one filler material comprises particles.

20. The composite body of claim 13, wherein said aluminum nitride possesses at least two separately identifiable and physically distinct forms.

21. The composite body of claim 16, wherein said aluminum nitride coating is formed by a chemical reaction of magnesium nitride with the matrix metal.

* * * * *